United States Patent
Geliot et al.

(10) Patent No.: US 12,312,096 B2
(45) Date of Patent: May 27, 2025

(54) ASSEMBLY FOR AN AIRCRAFT, SAID ASSEMBLY COMPRISING A PYLON AND A RESERVOIR CONTAINING AN EXTINGUISHING FLUID

(71) Applicant: Airbus Operations (S.A.S.), Toulouse (FR)

(72) Inventors: Jean Geliot, Toulouse (FR); Adeline Soulie, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 18/599,530

(22) Filed: Mar. 8, 2024

(65) Prior Publication Data
US 2024/0300665 A1 Sep. 12, 2024

(30) Foreign Application Priority Data
Mar. 9, 2023 (FR) .......................... 2302163

(51) Int. Cl.
*B64D 45/00* (2006.01)
*A62C 3/08* (2006.01)
*A62C 35/02* (2006.01)

(52) U.S. Cl.
CPC ............... *B64D 45/00* (2013.01); *A62C 3/08* (2013.01); *A62C 35/02* (2013.01); *B64D 2045/009* (2013.01)

(58) Field of Classification Search
CPC .... B64D 45/00; B64D 2045/009; A62C 3/08; A62C 35/009
See application file for complete search history.

(56) References Cited

U.S. PATENT DOCUMENTS

| | | | | |
|---|---|---|---|---|
| 8,800,675 | B2* | 8/2014 | Machado | A62C 13/78 169/53 |
| 11,434,020 | B2* | 9/2022 | Cayssials | B64D 45/00 |
| 11,547,884 | B2* | 1/2023 | Cayssials | A62C 35/13 |
| 11,834,169 | B2* | 12/2023 | Tulloch | B64D 27/357 |
| 2010/0230122 | A1* | 9/2010 | Machado | A62C 3/08 169/62 |
| 2019/0054332 | A1 | 2/2019 | Gilbert | |
| 2020/0324154 | A1* | 10/2020 | Cayssials | A62C 35/13 |
| 2021/0101694 | A1* | 4/2021 | Cayssials | B64D 37/32 |
| 2021/0188457 | A1* | 6/2021 | Cayssials | F02C 7/25 |

(Continued)

OTHER PUBLICATIONS

European Search Report in EP Application No. 24159746.7, dated Jun. 17, 2024, 3 pages.

(Continued)

*Primary Examiner* — Philip J Bonzell
(74) *Attorney, Agent, or Firm* — KDW Firm PLLC (57) ABSTRACT

An assembly for an aircraft includes a pylon with a frame and two lateral walls pierced with an aperture, a reservoir, a hooking system to suspend the reservoir facing the apertures, a carriage having a cradle for the reservoir, the carriage being movable in translation between an installation position, in which the cradle is facing the apertures and is under the reservoir, and a use position, in which the cradle is not facing the apertures, fastening elements for fastening the reservoir to the cradle, and a locking system arranged to immobilize the carriage in the use position. The assembly allows quick and simple removal and installation of the reservoir from and into the pylon.

8 Claims, 7 Drawing Sheets

(56) References Cited

U.S. PATENT DOCUMENTS

2022/0250758 A1* 8/2022 Devendorf ............. B64D 29/02
2022/0274684 A1* 9/2022 Tulloch ..................... B64F 5/50
2023/0000697 A1* 1/2023 Geliot ...................... A62C 3/08
2024/0351704 A1* 10/2024 Baderspach ............ B64D 45/00
2024/0417088 A1* 12/2024 Deforet .................... A62C 3/08

OTHER PUBLICATIONS

European Decision to Grant in EP Application No. 24159746.7, dated Mar. 20, 2025, 3 pages.
French Search Report for Application No. 2302163 dated Sep. 4, 2023.

* cited by examiner

ASSEMBLY FOR AN AIRCRAFT, SAID ASSEMBLY COMPRISING A PYLON AND A RESERVOIR CONTAINING AN EXTINGUISHING FLUID

TECHNICAL FIELD

The disclosure herein relates to an assembly for an aircraft, the assembly comprising a pylon and a reservoir containing an extinguishing fluid, and to an aircraft comprising at least one such assembly.

BACKGROUND

An aircraft conventionally comprises at least one nacelle inside which is arranged an engine, for example of the jet engine type. The nacelle and the engine are fastened to the structure of the aircraft by way of a pylon fastened under the wing of the aircraft.

In order to avoid damaging the structure of the aircraft if the engine catches fire, the aircraft is equipped with a fire-fighting system which comprises two reservoirs.

Figure 8:
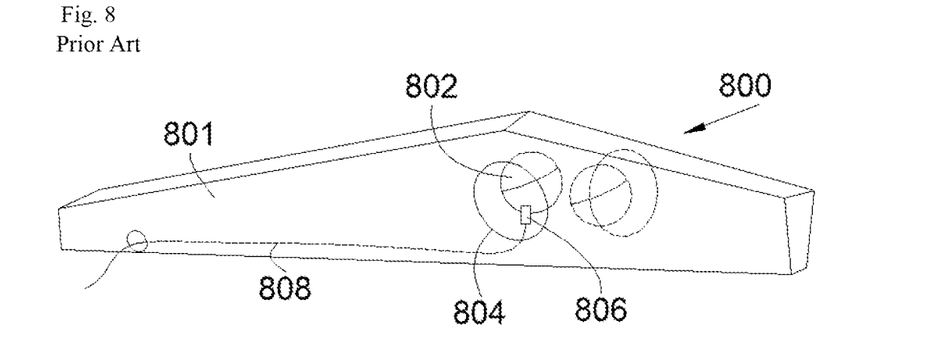
FIG. 8 is a perspective view of an assembly of the prior art.

FIG. 8 shows an assembly 800 of the prior art which comprises a pylon 801 and two reservoirs 802 which are installed in the pylon 801 and which each contain an extinguishing fluid. Each reservoir 802 is spherical and, for each reservoir 802, the pylon 801 has an aperture 804 which passes through a lateral wall of the pylon 801 and through which the reservoir 802 is inserted and fastened inside the pylon 801.

Each reservoir 802 is equipped with a discharge head 806 which comprises a disc which closes the reservoir 802 and an explosive cartridge which destroys the disc when it is activated. For each reservoir 802, the fire-fighting system also comprises a discharge line 808 which extends inside the pylon 801 between the discharge head 806 and the engine.

The destruction of the disc makes it possible to release the extinguishing fluid, which then flows in the discharge line 808 towards the engine.

For environmental reasons, the extinguishing products which are currently used, such as Halon, must be replaced with new extinguishing products. These new extinguishing products require a greater volume to fulfil their function, and it is therefore necessary to enlarge each reservoir 802.

Each reservoir 802 then becomes heavier and, since the space inside the pylon 801 remains restricted, handling and installation of the reservoir 802 becomes arduous.

It is therefore necessary to find a different installation that makes it easier to install and remove each reservoir.

SUMMARY

One object of the disclosure herein is to propose an assembly for an aircraft, where the assembly comprises a pylon and at least one reservoir containing an extinguishing fluid, and, for the or each reservoir, a system which ensures quick and simple installation of the reservoir in the pylon.

To this end, what is proposed is an assembly for an aircraft, the assembly comprising:
- a pylon extending in a longitudinal direction and comprising a frame and two lateral walls arranged on either side of the frame, each pierced with an aperture,
- at least one reservoir comprising fastener(s);
- a hooking system arranged to suspend the or each reservoir inside the pylon facing the apertures,
- for each reservoir, a carriage having a cradle intended to receive the reservoir, the carriage being mounted inside the frame so as to be movable in translation with respect to the frame parallel to a translation direction generally parallel to the longitudinal direction alternately between an installation position, in which the carriage is arranged in such a way that the cradle is facing the apertures and is under the reservoir, and a use position, in which the carriage is arranged in such a way that the cradle is not facing the apertures,
- for each reservoir, fastening elements which fasten the fasteners of the reservoir to the cradle; and
- for each carriage, a locking system alternately adopting a locking position, in which the locking system immobilizes the carriage in the use position, or a free position, in which the locking system does not immobilize the carriage.

Such an assembly allows quick and simple removal and installation of the reservoir from and into the pylon.

Advantageously, the hooking system comprises a horizontal bar perpendicular to the translation direction and secured to the frame, and a hook secured to the reservoir and taking the form of an L which is arranged to hook on the bar and is open on the side opposite to the use position.

Advantageously, the assembly comprises two rails secured to the frame, and the carriage is mounted so as to slide on the rails by way of a slide connection.

Advantageously, the carriage comprises two intermediate rails, where each is mounted so as to slide on one of the rails by a slide connection, and the cradle has two end rails, where each is mounted so as to slide on one of the intermediate rails by a slide connection.

Advantageously, the locking system comprises, on either side of a median plane, a guide block secured to the frame and oriented towards the installation position, a receptacle produced in the cradle, where the receptacle fits onto the block in the use position, and a locking element which secures the cradle to the frame in the use position.

Advantageously, each guide block takes the form of an element of oblong shape with the major axis oriented vertically, and each receptacle takes the form of a hole of oblong shape.

Advantageously, the assembly comprises two reservoirs and, for one of the reservoirs, the translational movement for passing from the installation position to the use position is carried out in the opposite direction to the translational movement for passing from the installation position to the use position of the other reservoir.

The disclosure herein also proposes an aircraft comprising an assembly according to one of the preceding variants.

BRIEF DESCRIPTION OF THE DRAWINGS

The features of the disclosure herein that are mentioned above, along with others, will become more clearly apparent from reading the following description of an example embodiment, the description being given with reference to the appended drawings, in which.

DETAILED DESCRIPTION

Figure 1:
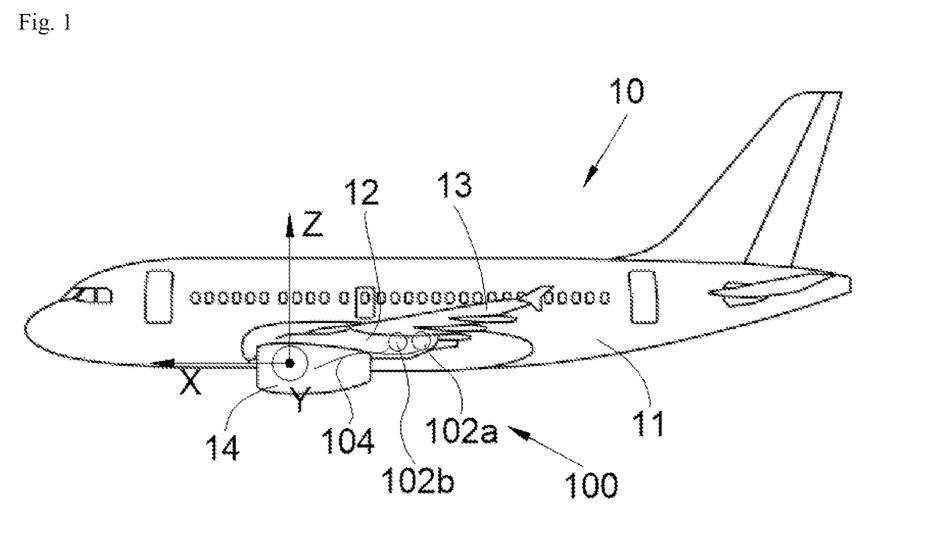
FIG. 1 is a side view of an aircraft according to the disclosure herein.

In the description which follows, the terms relating to a position are taken by reference to an aircraft in the normal flight position, that is to say as it is shown in FIG. 1.

In the description which follows, and by convention, X is called the longitudinal direction of the jet engine, which is parallel to the longitudinal axis of the aircraft and oriented towards the front, Y is called the transverse direction, which is horizontal when the aircraft is on the ground, and Z is called the vertical direction, which is vertical when the aircraft is on the ground, these three directions X, Y and Z being orthogonal to one another.

FIG. 1 shows an aircraft 10 which comprises a fuselage 11 on each side of which is fastened a wing 13 which carries an engine 14, such as a turbofan jet engine, for example.

For each engine 14, the aircraft 10 also comprises a pylon 12 which serves to fasten the engine 14 under the wing 13.

For each engine 14, the aircraft 10 comprises a fire-fighting system 100 which comprises at least one reservoir 102*a-b* filled with an extinguishing fluid and, for each reservoir 102*a-b*, a discharge line 104 which extends between the reservoir 102*a-b* and the engine 14 supported by the pylon 12. In the embodiment of the disclosure herein presented here, there are two reservoirs 102*a-b*, but the disclosure herein applies in the same way for a single reservoir 102*a-b*. In the remainder of the description, unless otherwise stated, reference is made to a single reservoir 102*a*.

As for the prior art, the reservoir 102*a* is equipped with a discharge head which is arranged to release the extinguishing fluid towards the discharge line 104 as required.

Figure 2:
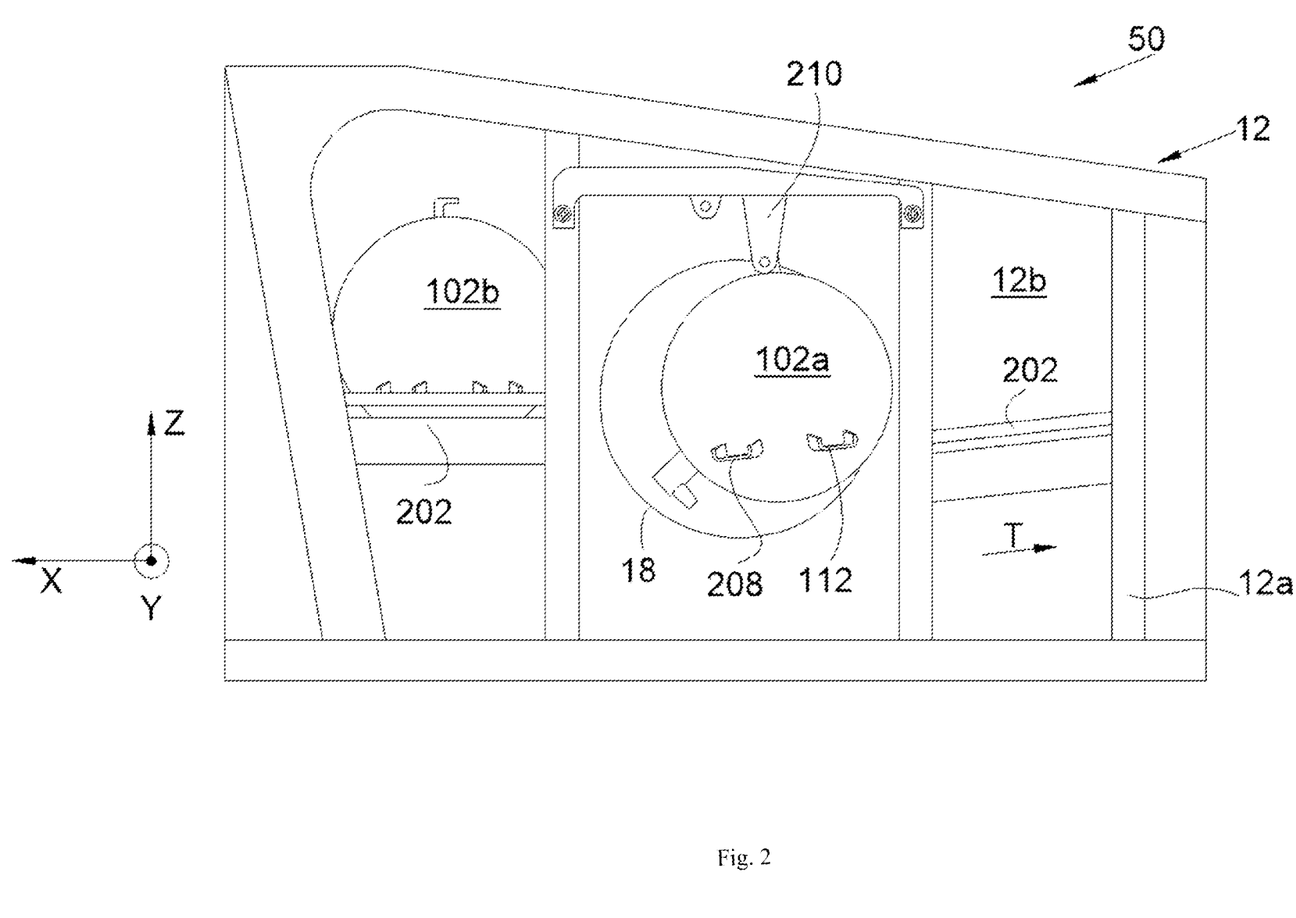
FIG. 2 is a side view of an assembly according to the disclosure herein in a first position of the assembly.
Figure 3:
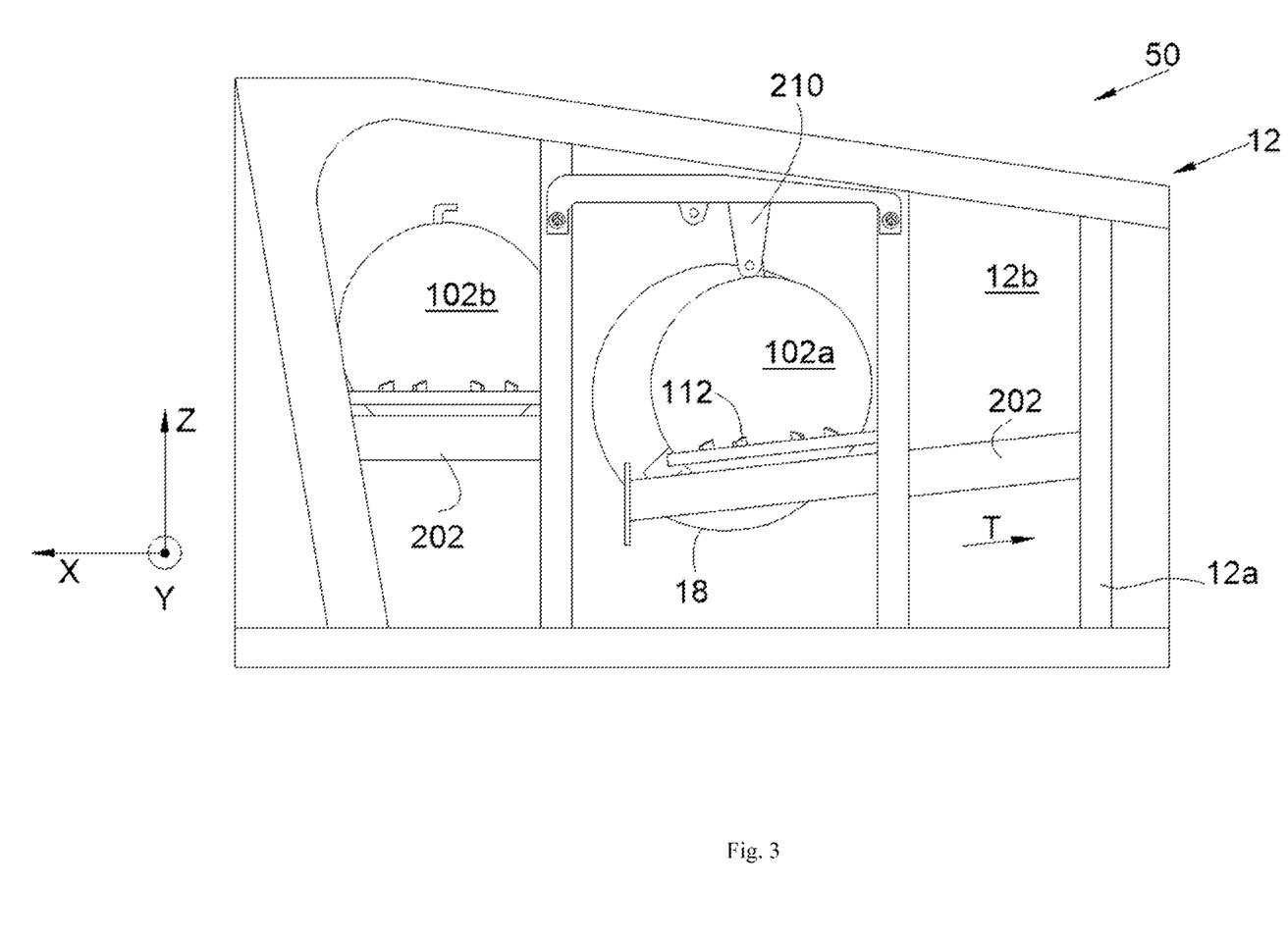
FIG. 3 is the same side view as that of FIG. 2 in a second position of the assembly.
Figure 4:
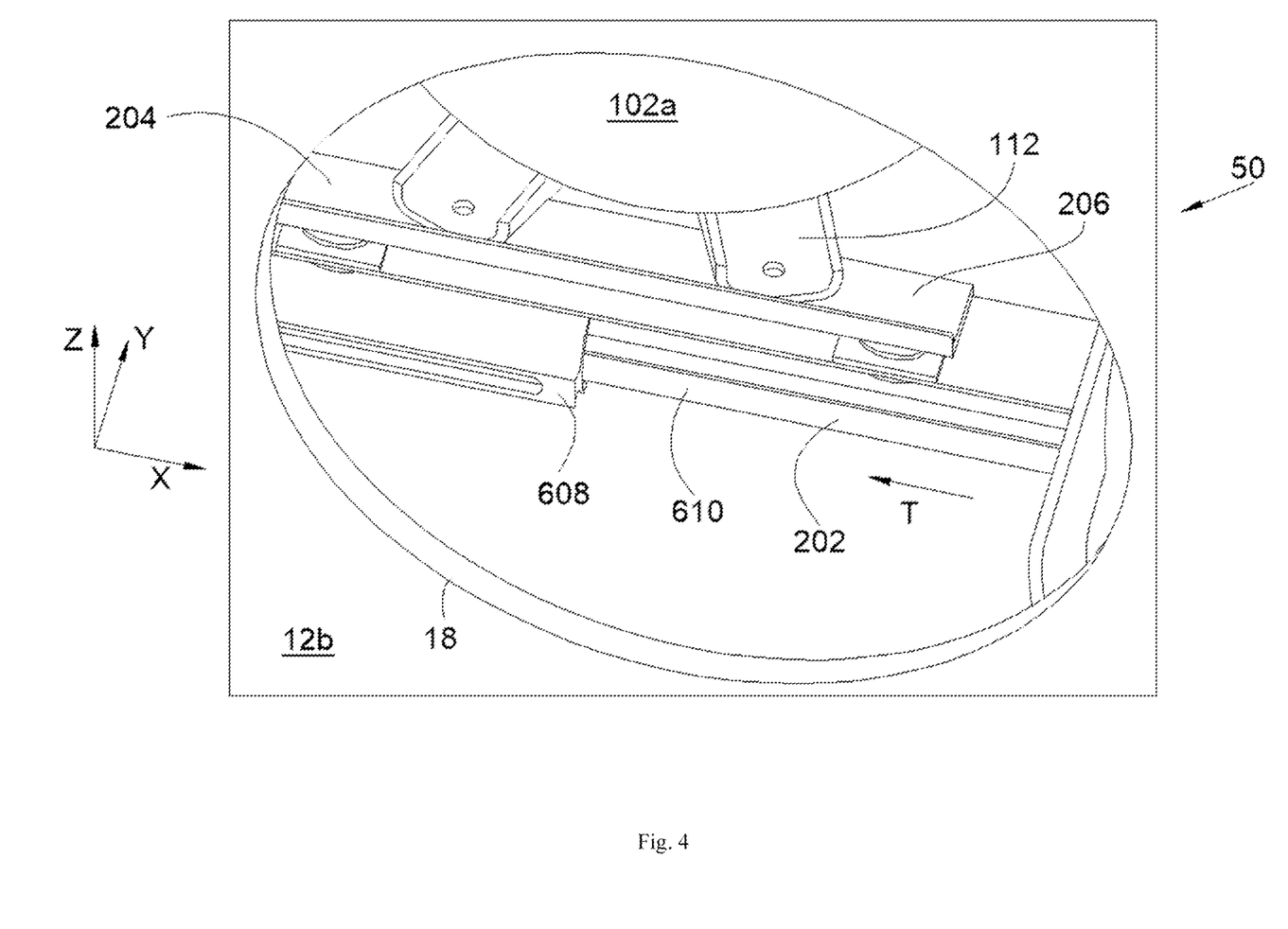
FIG. 4 is a perspective view of a detail for implementing the disclosure herein.

FIGS. 2 to 4 show an assembly 50 which comprises the pylon 12 and the reservoir 102*a*.

The pylon 12 conventionally extends in the longitudinal direction X and comprises a structure made up of a frame 12*a* and of walls fastened around the frame 12*a*.

The frame 12*a* consists, for example, of a plurality of profiles fastened to one another.

Among the walls, there are at least two lateral walls 12*b* which extend on either side of a vertical median plane XZ of the pylon 12. The two lateral walls 12*b* are thus fastened on either side of the frame 12*a* in generally vertical planes parallel to the median plane.

Each lateral wall 12*b* is pierced with an aperture 18 (seen in the background in FIGS. 2 and 3) which makes it possible to gain access to the inside of the pylon 12 and the frame 12*a* from outside the pylon 12, and the aperture 18 is dimensioned to allow the passage of the reservoir 102*a*. The two apertures 18 are arranged facing each other with respect to the median plane XZ.

The reservoir 102*a* is equipped with fasteners 112 which are arranged on either side of the median plane XZ when the reservoir 102*a* is in place. As explained below, when the reservoir 102*a* is placed in the pylon 12 through the aperture 18, the fasteners 112 are accessible from each aperture 18. The fasteners 112 are lugs here. The fasteners 112 cooperate with fastening elements for fastening the reservoir 102*a* inside the pylon 12 when the reservoir 102*a* is in place.

The assembly 50 also comprises a hooking system 210 which is arranged to suspend the reservoir 102*a* inside the pylon 12 facing the apertures 18. The suspension is releasable, that is to say that the reservoir 102*a* can be unhooked easily, or even automatically, as is described below. In order to lighten the assembly 50, the hooking system 210 may be removable, that is to say demountable, and be withdrawn after the installation of the reservoir 102*a-b*.

Figure 6:
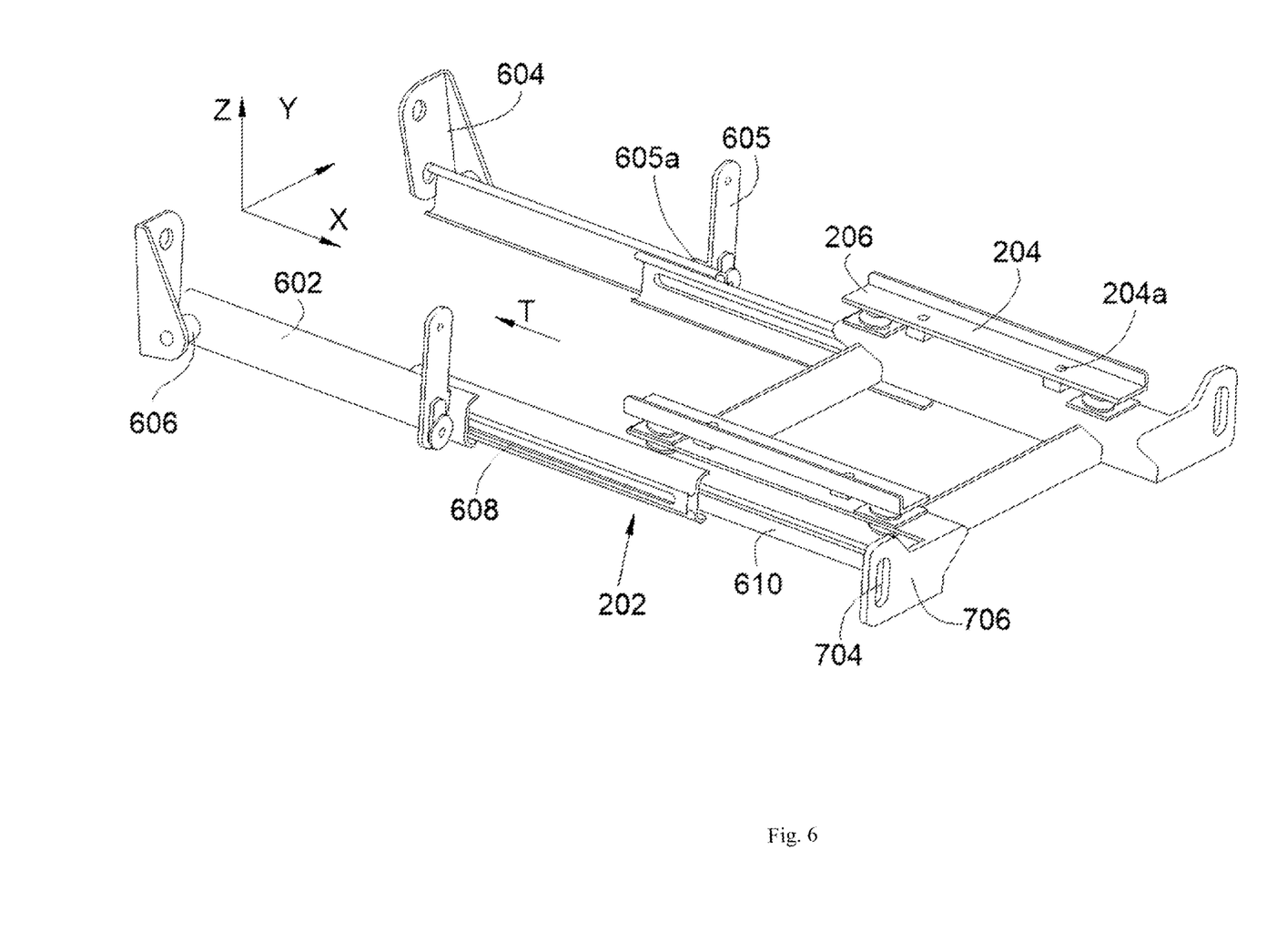
FIG. 6 is a perspective view of an example of a carriage employed in the assembly according to the disclosure herein.

The assembly 50 also comprises a carriage 202 which is mounted inside the frame 12*a* and an embodiment of which is shown in FIG. 6. Of course, when there are a plurality of reservoirs 102*a-b*, there is one carriage 202 per reservoir 102*a-b*.

In the embodiment of the disclosure herein presented in FIG. 6, the carriage 202 is mounted so as to be movable in translation parallel to a translation direction T with respect to the frame 12*a*. For this purpose, the assembly 50 comprises two rails 602 which are secured to the frame 12*a* and along which the carriage 202 slides by a slide connection between the carriage 202 and the rails 602. The two rails 602 extend parallel to the translation direction T.

The carriage 202 has a cradle 204 intended to receive the reservoir 102*a*, and the carriage 202 is movable with respect to the frame 12*a* alternately between an installation position (FIG. 3) and a use position (FIG. 2).

In the installation position, the carriage 202 is arranged in such a way that the cradle 204 is facing the apertures 18 and is under the reservoir 102*a*, which is suspended on the hooking system 210, and, in the use position, the carriage 202 is arranged in such a way that the cradle 204 is not facing the apertures 18.

In the embodiment of the disclosure herein presented in FIGS. 2 to 4 and 6, the carriage 202 moves in translation parallel to the translation direction T, which is parallel to the median plane XZ and generally parallel to the longitudinal direction X. In the embodiment of the disclosure herein presented in FIGS. 2 and 3, the translation direction T rises slightly towards the rear of the pylon 12 with respect to the longitudinal direction X. Depending on the case, the carriage 202 therefore moves here towards the front of the pylon 12 in order to reach the installation position or towards the rear of the pylon 12 in order to reach the use position.

The fasteners 112 are fastened to the cradle 204 using fastening elements such as screws which are screwed through the lugs into the cradle 204 into bores 204*a* provided for this purpose.

The installation of the reservoir 102*a* thus consists:

in placing the carriage 202 in the use position, that is to say away from the apertures 18 to allow free space between the apertures 18, in introducing the reservoir 102*a* into the frame 12*a* through one of the apertures 18, in suspending the reservoir 102*a* in the frame 12*a* using the hooking system 210, in moving the carriage 202 into the installation position, that is to say in placing the cradle 204 under the reservoir 102*a*, in fastening the fasteners 112 to the cradle 204 from outside the pylon 12 through the apertures 18 using fastening elements, for example by installing screws, and in moving the carriage 202 into the use position by releasing the reservoir 102*a* from the hooking system 210.

Figure 7:
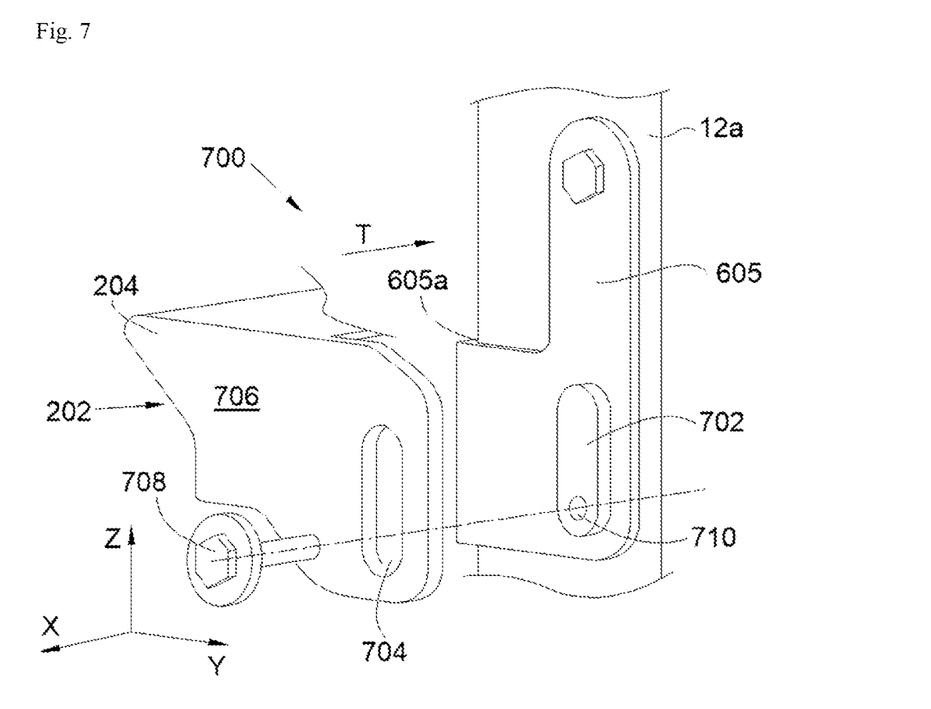
FIG. 7 is a perspective view of an example of a locking system for the carriage of FIG. 6.

The assembly 50 also comprises a locking system 700, an embodiment of which is shown in FIG. 7, and which alternately adopts a locking position or a free position. In the locking position, the locking system 700 immobilizes the carriage 202 in the use position, and, in the free position, the locking system 700 does not immobilize the carriage 202, which is then free to move from the use position to the installation position, and vice versa. Of course, when there are a plurality of reservoirs 102a-b and therefore a plurality of carriages 202, there is one locking system 700 per carriage 202.

With such an assembly 50, the installation of the reservoir is facilitated, since the reservoir 102a is placed on a movable carriage 202 and it can be retracted towards the rear of the pylon 12. Furthermore, by shifting the reservoir 102a towards the rear into the use position, this leaves the possibility of placing another reservoir 102b, which is then shifted oppositely towards the front into the use position.

FIGS. 2 and 3 thus show a second reservoir 102b which is already placed in the use position, and which is arranged towards the front of the pylon 12. The passage from the use position to the installation position is thus inverted with respect to the first reservoir 102a. The translation directions of each reservoir 102a-b can be slightly different, but they remain generally parallel to the longitudinal direction X and therefore generally horizontal. The term "generally" is to be understood to mean that the reservoir 102a-b moves alternately towards the front and the rear of the pylon 12. Thus, in a general manner, when the assembly 50 comprises two reservoirs 102a-b, for one of the reservoirs 102a-b, the translational movement for passing from the installation position to the use position is carried out in the opposite direction to the translational movement for passing from the installation position to the use position of the other reservoir 102b-a.

The cradle 204 has at least one first bearing face 206 oriented upwardly, and each of the fasters 112 has a second bearing face 208 oriented downwardly, and when the reservoir 102a is in place on the cradle 204, each second bearing face 208 bears against a first bearing face 206.

In the embodiment of the disclosure herein, the cradle 204 has two first bearing faces 206 arranged on either side of the median plane XZ.

Figure 5:
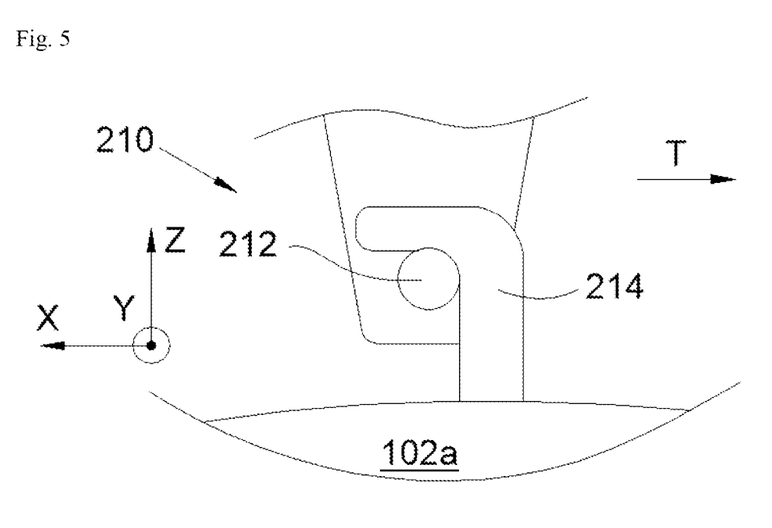
FIG. 5 is a representation of an attachment system employed in the assembly according to the disclosure herein.

The hooking system 210, an embodiment of which is shown in FIG. 5, comprises a bar 212 which is horizontal and perpendicular to the translation direction T, that is to say to the median plane XZ. The bar 212 is secured to the frame 12a.

As is shown in FIGS. 2 and 3, when there are a plurality of reservoirs 102a-b, the hooking system 210 may comprise one bar 212 per reservoir 102a-b according to the position of the cradle 204 in the installation position.

The hooking system 210 also comprises a hook 214 which is secured to the reservoir 102a and which here takes the form of an L which is arranged to be hooked on the bar 212. The hook 214 is open on the side opposite to the use position. Thus, when the reservoir 102a is moved from the installation position to the use position, it is separated from the bar 212.

With such an arrangement, the unhooking of the reservoir 102a from the bar 212 is then automatic when the carriage 202 is moved towards the use position.

The position of the bar 212 and the length of the hook 214 are intended to ensure that, when the fasters 112 are fastened to the cradle 204 by the fastening elements, the pressure exerted by the hook 214 on the bar 212 is sufficiently small to allow the movement of the carriage 202 and the movement of the hook 214 with respect to the bar 212.

Of course, the hooking system 210 may take another form. For example, the hooking system may take the form of a bar similar to that described above and of a clamp which grips around the bar and is releasable by the clamp being opened by a technician.

In the embodiment of the disclosure herein presented in FIG. 6, each rail 602 is fastened at each of its ends to the frame 12a. In the embodiment of the disclosure herein presented in FIG. 6, a first end is fastened by way of a first fitting 604 of the frame 12a, and a second end is fastened by way of a second fitting 605 of the frame 12a. In the embodiment of the disclosure herein presented here, the first end is secured to the associated fitting 604, that is to say on the frame 12a, by way of a pin 606, and the second end is fastened to a leg 605a of the second fitting 605.

In the embodiment of the disclosure herein presented in FIG. 6, the carriage 202 takes the form of a telescopic system which slides along the rails 602. The carriage 202 thus comprises two intermediate rails 608, where each is mounted so as to slide on one of the rails 602 by a slide connection, and the cradle 204 also has two end rails 610, where each is mounted so as to slide on one of the intermediate rails 608 by a slide connection.

Each slide connection is not shown in detail, but it may take any form known to a person skilled in the art.

To ensure good positioning of the cradle 204 in the use position, the locking system 700 comprises guide and fastening elements on either side of the median plane XZ.

FIG. 7 shows the guide and fastening elements which are on one of the sides of the median plane XZ, and the guide and fastening elements which are on the other side are symmetrical.

The locking system 700 thus comprises, on either side of the median plane XZ, a guide block 702 secured to the frame 12a and oriented towards the installation position and a receptacle 704 produced in the cradle 204, here in a tab 706 of the cradle 204. In the embodiment of the disclosure herein presented in FIG. 7, the guide block 702 is secured to the second fitting 605.

When the cradle 204 reaches the use position, the receptacle 704 fits onto the block 702 in such a way as to fix the position of the cradle 204 with respect to the frame 12a.

The receptacle 704 and the guide block 702 are dimensioned in such a way that the fit between them is of the sliding fit or tight sliding fit type.

The locking system 700 thus comprises, on either side of the median plane XZ, a locking element 708 which secures the cradle 204 to the frame 12a in the use position. In the embodiment of the disclosure herein presented here, the locking element 708 takes the form of a screw which is screwed through the receptacle 704 into a hole 710 made in the guide block 702.

In the embodiment of the disclosure herein presented in FIG. 7, each guide block 702 takes the form of an oblong element with the major axis oriented vertically, and each receptacle 704 takes the form of a corresponding hole of oblong shape. The oblong shapes allow better alignment of the cradle 204 with respect to an optimum use position.

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An assembly for an aircraft, the assembly comprising:
a pylon extending in a longitudinal direction and comprising a frame and two lateral walls arranged on either side of the frame, each comprising an aperture;
at least one reservoir comprising one or more fasteners;
a hooking system arranged to suspend the or each reservoir inside the pylon facing the apertures;
for each reservoir, a carriage having a cradle to receive the reservoir, the carriage being mounted inside the frame to be movable in translation with respect to the frame parallel to a translation direction generally parallel to the longitudinal direction alternately between an installation position, in which the carriage is arranged such that the cradle is facing the apertures and is under the reservoir, and a use position, in which the carriage is arranged such that the cradle is not facing the apertures;
for each reservoir, fastening elements which fasten the fasteners of the reservoir to the cradle; and
for each carriage, a locking system alternately adopting a locking position, in which the locking system immobilizes the carriage in the use position, or a free position, in which the locking system does not immobilize the carriage.

2. The assembly according to claim 1, wherein the hooking system comprises a horizontal bar perpendicular to the translation direction and secured to the frame, and a hook secured to the reservoir and taking a form of an L which is arranged to hook on the horizontal bar and is open on a side opposite to the use position.

3. The assembly according to claim 1, comprising two rails secured to the frame, and wherein the carriage is mounted to slide on the rails by a slide connection.

4. The assembly according to claim 3, wherein the carriage comprises two intermediate rails, where each is mounted to slide on one of the rails by the slide connection, and wherein the cradle has two end rails, where each is mounted to slide on one of the intermediate rails by the slide connection.

5. The assembly according to claim 1, wherein the locking system comprises, on either side of a median plane, a guide block secured to the frame and oriented towards the installation position, a receptacle in the cradle, where the receptacle fits onto the guide block in the use position, and a locking element which secures the cradle to the frame in the use position.

6. The assembly according to claim 5, wherein each guide block takes a form of an element of oblong shape with a major axis oriented vertically, and each receptacle takes a form of a hole of oblong shape.

7. The assembly according to claim 1, wherein the at least one reservoir comprises two reservoirs, and wherein, for one of the reservoirs, the translational movement for passing from the installation position to the use position is carried out in an opposite direction to the translational movement for passing from the installation position to the use position of the other reservoir.

8. An aircraft comprising the assembly according to claim 1.

* * * * *